(12) United States Patent
Kim et al.

(10) Patent No.: US 7,853,301 B2
(45) Date of Patent: Dec. 14, 2010

(54) SLIDING MODULE FOR DOUBLE SLIDING-TYPE PORTABLE COMMUNICATION TERMINAL

(75) Inventors: Young-Kyu Kim, Daegu (KR); Jae-Gab Lee, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 738 days.

(21) Appl. No.: 11/775,417

(22) Filed: Jul. 10, 2007

(65) Prior Publication Data

US 2008/0070650 A1 Mar. 20, 2008

(30) Foreign Application Priority Data

Sep. 19, 2006  (KR) .................. 10-2006-0090614
Mar. 29, 2007  (KR) .................. 10-2007-0030842

(51) Int. Cl.
*H04M 1/00* (2006.01)
(52) U.S. Cl. ............... 455/575.4; 455/575.1; 455/90.3; 379/433.12; 361/679.56
(58) Field of Classification Search ............. 455/575.1, 455/575.4, 90.3, 550.1; 379/433.12; 361/679.56
See application file for complete search history.

(56) References Cited

U.S. PATENT DOCUMENTS

| | | | |
|---|---|---|---|
| 6,850,226 B2* | 2/2005 | Finke-Anlauff | 345/169 |
| 7,076,058 B2* | 7/2006 | Ikeuchi et al. | 379/433.12 |
| 7,107,018 B2* | 9/2006 | Jellicoe | 455/90.3 |
| 7,324,643 B2* | 1/2008 | Lehtonen et al. | 379/433.13 |
| 7,422,436 B2* | 9/2008 | Lee | 439/10 |
| 7,636,591 B2* | 12/2009 | Kim et al. | 455/575.4 |
| 7,656,662 B2* | 2/2010 | Chen | 361/679.55 |
| 7,671,836 B2* | 3/2010 | Lehtonen | 345/156 |
| 2005/0255897 A1* | 11/2005 | Lee et al. | 455/575.4 |
| 2006/0046796 A1* | 3/2006 | Park et al. | 455/575.4 |
| 2006/0146014 A1 | 7/2006 | Lehtonen | |
| 2007/0142101 A1* | 6/2007 | Seshagiri et al. | 455/575.4 |
| 2008/0051161 A1* | 2/2008 | Tashiro | 455/575.1 |
| 2008/0076380 A1* | 3/2008 | Seo | 455/349 |
| 2008/0186663 A1* | 8/2008 | Chen | 361/681 |
| 2009/0005135 A1* | 1/2009 | Lindgren et al. | 455/575.4 |
| 2009/0036180 A1* | 2/2009 | Ye | 455/575.4 |

FOREIGN PATENT DOCUMENTS

| | | | |
|---|---|---|---|
| CN | 1694466 A | | 11/2005 |
| EP | 1 592 209 A2 | | 11/2005 |

(Continued)

*Primary Examiner*—Sharad Rampuria
(74) *Attorney, Agent, or Firm*—Jefferson IP Law., LLP (57) ABSTRACT

A sliding module for a double sliding-type portable communication terminal is provided. The double sliding-type portable communication terminal includes a body housing and a sliding housing movably coupled to the body housing so as to slide on the body housing in a first direction and a second direction substantially perpendicular to the first direction. The sliding module includes a base member, a first sliding member laminated on the base member to enable the sliding housing to slide on the body housing in the first direction, a second sliding member integrally mounted on the sliding housing and laminated on the first sliding member to allow the sliding housing to slide on the body housing in the second direction, and a guide member provided for the sliding housing to guide the sliding movement of the second sliding member.

19 Claims, 13 Drawing Sheets

FOREIGN PATENT DOCUMENTS

| | | |
|---|---|---|
| EP | 1 631 043 A1 | 3/2006 |
| EP | 1 775 596 A2 | 4/2007 |
| EP | 1 775 917 A1 | 4/2007 |
| EP | 1 786 181 A2 | 5/2007 |
| EP | 1 871 076 A1 | 12/2007 |
| WO | 2006/041238 A1 | 4/2006 |

* cited by examiner

SLIDING MODULE FOR DOUBLE SLIDING-TYPE PORTABLE COMMUNICATION TERMINAL

PRIORITY

This application claims the benefit under 35 U.S.C. §119 (a) of Korean patent applications filed in the Korean Intellectual Property Office on Sep. 19, 2006 and Mar. 29, 2007, and assigned Serial Nos. 2006-90614 and 2007-30842, respectively, the entire disclosures of which are hereby incorporated by reference.

BACKGROUND OF THE INVENTION

1. Field of the Invention

The present invention relates to portable communication terminals, such as cellular phones, Personal Digital Assistants (PDAs), Hand-Held Phones (HHPs), communication devices, and the like. More particularly, the present invention relates to a double sliding-type portable communication terminal.

2. Description of the Related Art

In general, "portable terminals" are devices by which a user can wirelessly communicate with another user or a service provider through a mobile communication base station. Users can use voice communication services, send short messages, conduct mobile banking, watch TV, and use various kinds of service content, such as on-line games, video on demand (VOD), and the like, through the portable terminal.

Conventional portable terminals may be classified into various types according to their appearance, such as bar-type portable terminals, flip-type portable terminals, and folder-type portable terminals. A bar-type portable terminal has a single housing shaped like a bar, on which a communication circuit and input/output units such as a transmitter and a receiver are mounted. A flip-type portable terminal has a flip panel which is pivotally mounted to a bar-shaped housing. A folder-type portable terminal has a pair of housings rotatably coupled to each other to open and close, on which input and output units are disposed. Recently, sliding-type portable terminals have appeared and satisfied users various needs and tastes along with the folder-type portable terminals, so as to improve the portability of the terminal and the convenience for user.

Initially, mobile communication services using such portable terminals were limited to voice communication, short message sending, and the like. Now, mobile communication services have expanded to include transmission of game files, music files, and moving picture files, on-line games, and multi-media services.

As the functions of portable terminals and the content of mobile communication services have diversified, the designs of the portable terminal have also diversified. For instance, input and output units have been added to the portable terminal to conveniently use the variety of functions of the portable terminal.

A conventional sliding-type portable communication terminal has a structure in which one of two housings slides on the other while continuously facing the other. Since two housings are used, the total thickness of the portable terminal is increased. This runs counter to consumers desires for slim portable communication terminals.

To address the above-mentioned problem, Korean Patent No. 616197, which is assigned to the assignee of the present invention, discloses a detailed configuration of a double sliding-type portable communication terminal.

Figure 1:
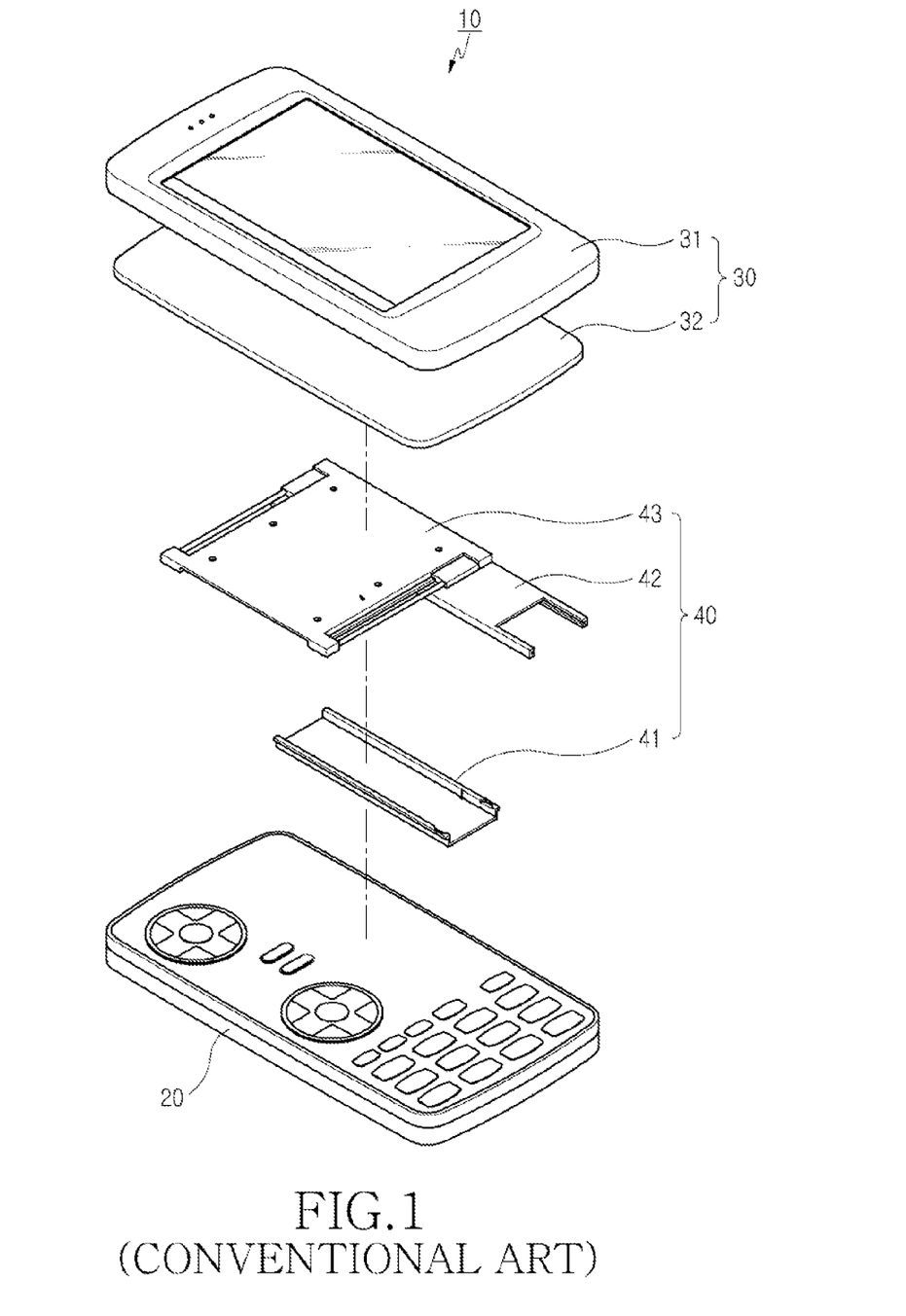
FIG. 1 is an exploded perspective view of a conventional double sliding-type portable terminal with a sliding module.
Figure 2:
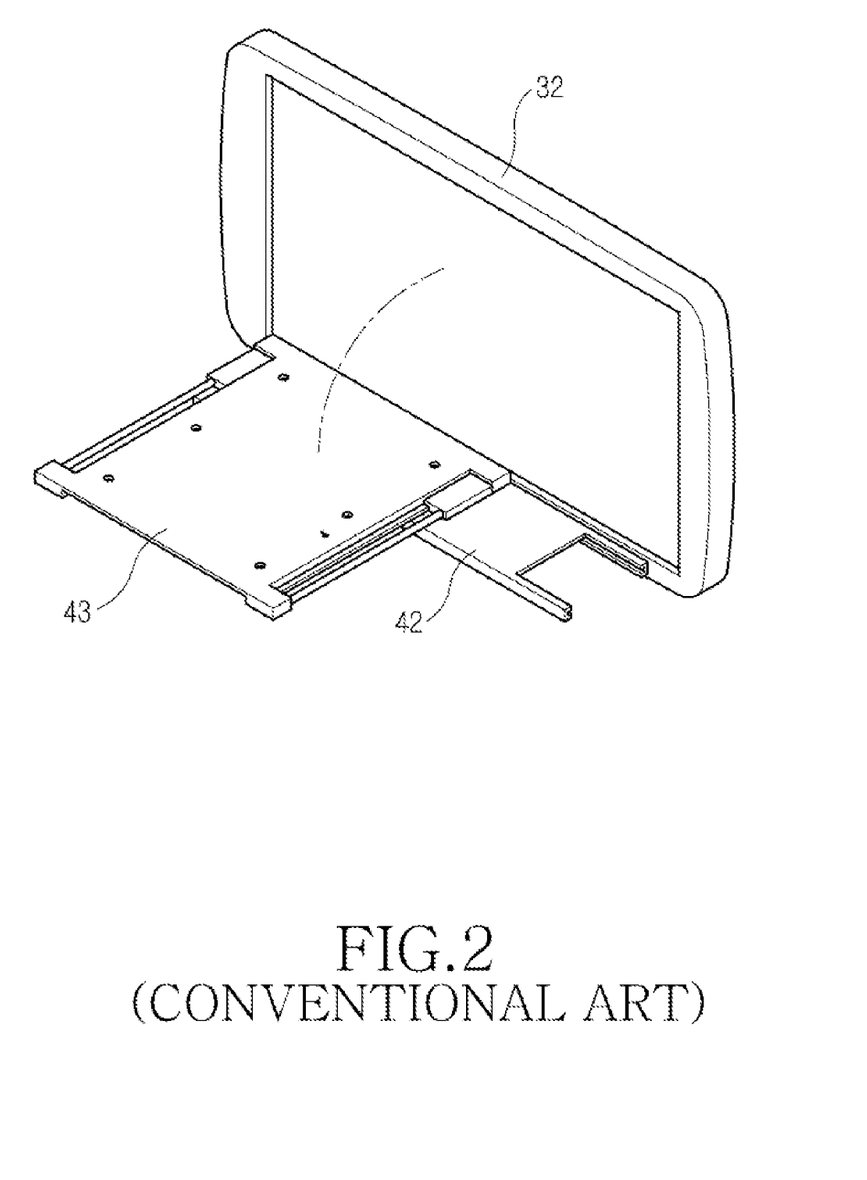
FIG. 2 is a perspective view of the sliding module of the conventional double sliding-type portable terminal illustrated in FIG. 1, in which the sliding module is assembled with a housing of the portable terminal.

As shown in FIGS. 1 and 2, the double sliding-type portable communication terminal 10 includes a body housing 20 and a sliding housing 30 coupled to the body housing 20 so as to slide on the body housing 20 in a first direction and a second direction substantially perpendicular to the first direction. The sliding module 40 of the double sliding-type portable communication terminal includes a base member 41 coupled to the body housing 20, a first sliding member 42 disposed on the base member 41 to enable the sliding housing 30 to slide on the body housing 20 in the first direction, and a second sliding member 43 disposed on the first sliding member 42 and coupled to the sliding housing 30 to enable the sliding housing 30 to slide on the body housing 20 in the second direction.

The sliding housing 30 includes upper and lower housings 31 and 32.

Since the base member 41 of the sliding module 40 of the conventional double sliding-type portable communication terminal 10 is coupled to the body housing 20, and the second sliding member is coupled to the sliding housing, the thickness of the sliding module increases. This causes an increase in the thickness of the portable terminal. This runs counter to consumers desires for slim portable terminals.

SUMMARY OF THE INVENTION

An aspect of the present invention is to address at least the above problems and/or disadvantages and to provide at least the advantages described below. Accordingly, an aspect of the present invention is to provide a double sliding-type portable communication terminal that has an integrated sliding module, thereby making the portable terminal slim.

Another aspect of the present invention is to provide a sliding module for a double sliding-type portable communication portable with a sliding member that can be integrated with a sliding housing, thereby reducing the thickness of the portable terminal to make the portable terminal slim.

Still another aspect of the present invention is to provide a sliding module for a double sliding-type portable communication terminal with an integrated base member, thereby reducing the thickness of the terminal to make the terminal slim.

In accordance with an aspect of the present invention, a sliding module for a double sliding-type portable communication terminal which includes a body housing and a sliding housing movably coupled to the body housing so as to slide on the body housing in a first direction and a second direction substantially perpendicular to the first direction is provided. The sliding module includes a base member, a first sliding member laminated on the base member to enable the sliding housing to slide on the body housing in the first direction, a second sliding member integrally mounted on the sliding housing and laminated on the first sliding member to allow the sliding housing to slide on the body housing in the second direction, and a guide member on the sliding housing to guide the sliding movement of the second sliding member.

In accordance with another aspect of the present invention, a sliding module for a double sliding-type portable communication terminal having a body housing, a sliding housing coupled to the body housing so as to slide on the body housing in a first direction and in a second direction substantially perpendicular to the first direction, and a sliding module for enabling sliding movement in the first and second directions is provided. The sliding module includes a base member integrally formed on the body housing, a first sliding member stacked on the base member to enable the sliding housing to slide in the first direction away from the body housing, a second sliding member integrally mounted on the sliding housing and stacked on the first sliding member to enable the sliding housing to slide in the second direction away from the body housing, a guide member positioned on the sliding housing to guide the sliding movement of the second sliding member, and a guide unit positioned along a periphery of the base member to guide the sliding movement of the first sliding member.

BRIEF DESCRIPTION OF THE DRAWINGS

The above and other objects, features, and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
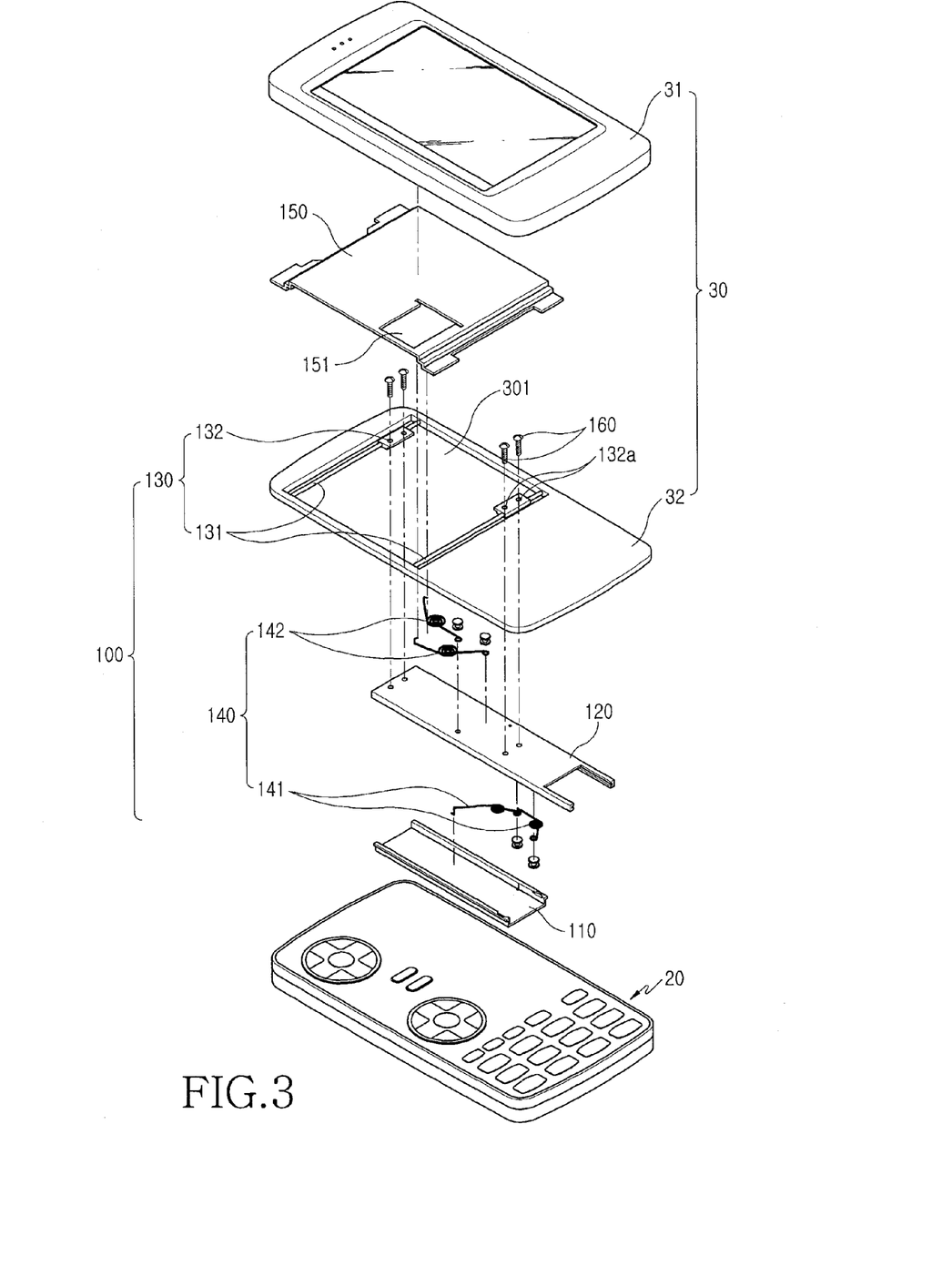
FIG. 3 is an exploded perspective view of a double sliding-type portable terminal with a sliding module according to an exemplary embodiment of the present invention.
Figure 4:
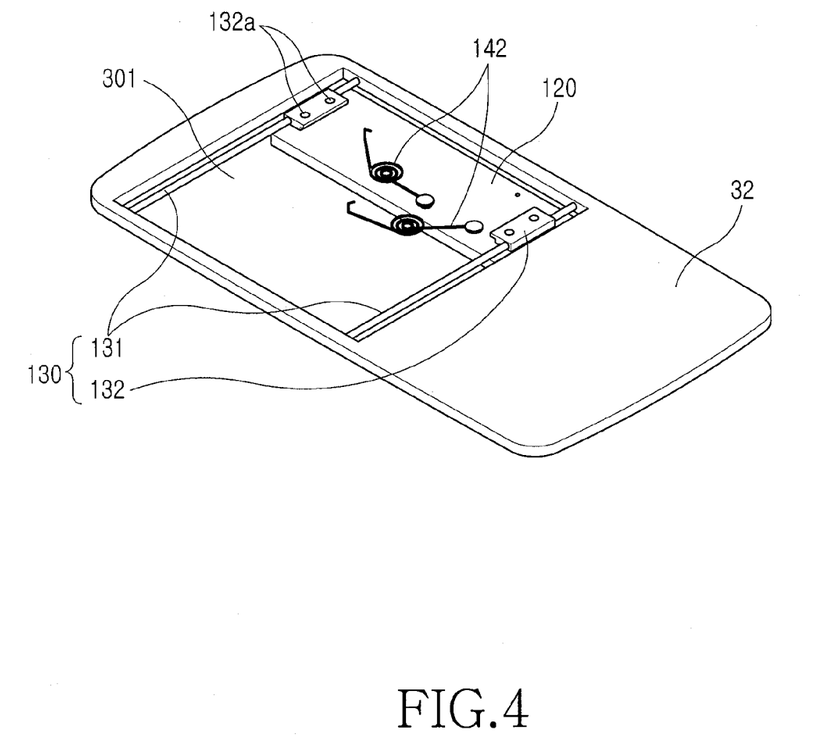
FIG. 4 is a perspective view of the sliding module of the double sliding-type portable terminal illustrated in FIG. 3 assembled with a housing of the portable terminal.

As shown in FIGS. 3 and 4, a double sliding-type portable communication terminal includes a body housing 20, a sliding housing 30, and a sliding module 100. The sliding housing 30 has upper and lower housings 31 and 32.

As shown in FIGS. 3, 5, 6, 7, and 8, the sliding module 100 includes a base member 110, first and second sliding members 120 and 130, and a guide member 150. The base member 110 is mounted on the body housing 20 to support the first sliding member 120 so that the first sliding member 120 slides in a first direction A1. The first sliding member 120 is stacked on the base member 110 so as to allow the sliding housing 30 to slide on the body housing 20 in the first direction A1. The second sliding member 130 is integrated with the sliding housing 30 so that the sliding housing slides on the body housing 20 in a second direction A2 substantially perpendicular to the first direction A1. The guide member 150 is attached to the sliding housing 30 to guide the sliding movement of the second sliding member 130.

As shown in FIG. 3, the lower housing 32 of the sliding housing 30 has a mounting hole 301 formed therein to mount the second sliding member 130. The mounting hole 301 is covered with the guide member 150 to guide the second sliding member 130.

As shown in FIGS. 3 and 4, the second sliding member 130 includes at least one guide rod 131 and sliding guide members 132. The guide rods 131 are mounted in the mounting hole 301 of the sliding housing 30 so as to guide the sliding guide members 132. The sliding guide members 132 are fixedly coupled to the upper surface of the first sliding member 120, and mounted on the guide rods 131 so as to guide the sliding movement of the sliding housing 30 in the second direction A2. Further, the sliding guide members 132 have at least one screw hole 132a formed therein, through which a screw 160 is coupled to the first sliding member 120.

As shown in FIG. 3, the guide member 150 is a plate, and is recessed by a desired depth to mount the second sliding member.

The guide member 150 has a flexible circuit hole 151 formed therein so that a flexible circuit (not shown) may be electrically connected to the body housing 20 through the flexible circuit hole 151.

Hereinafter, the operation of the sliding module of the double sliding-type portable communication terminal according to the exemplary embodiment of the prevent invention having the above-mentioned structure will be described in detail.

As shown in FIGS. 3 and 4, the sliding module 100 of the double sliding-type portable communication terminal includes a base member 110, first and second sliding members 120 and 130, and a guide member 150. The first sliding member 120 is laminated on the base member 110. In this state, the sliding housing 30 is coupled to the body housing 20 so that it slides on the body housing 20 in the first direction A1. The second sliding member 130 is integrally inserted in the mounting hole 301 formed in the sliding housing. The second sliding member 130 is laminated on the upper surface of the first sliding member 120. The sliding housing 30 is coupled to the body housing 20 so that it slides on the body housing 20 in the second direction A2.

As shown in FIG. 3, the sliding member 130 includes at least one guide rod 131 and at least one sliding guide unit 132. In the illustrated embodiment, two guide rods 131 and two guide units 132 are provided. The guide rods 131 are mounted in the mounting hole 301. The sliding guide units 132 are movably mounted on the guide rods 131 and fixedly coupled to the upper surface of the first sliding member 120. Each of the sliding guide units 132 has at least one screw-hole 132a formed therein. The sliding guide units 132 are mounted on the guide rods 131 and coupled to the upper surface of the first sliding member 120 to couple the sliding guide units and the first sliding member 120 with each other by screws 160 passing through the screw-holes 132a.

As shown in FIG. 3, the sliding housing 30 includes upper and lower housings 31 and 32. The lower housing 32 has a mounting hole 301 formed therein. The mounting hole 301 is covered with the guide member 150. The guide member 150 is a plate and has a recess at a desired depth so as to guide the sliding movement of the second sliding member 130.

As shown in FIG. 3, elastic means 140 is interposed between the first and second sliding housing members 120 and 130 and provides an elastic force so that the first and second sliding members 120 and 130 slide by the elastic force. The elastic means 140 includes first and second elastic members 141 and 142.

Figure 5:
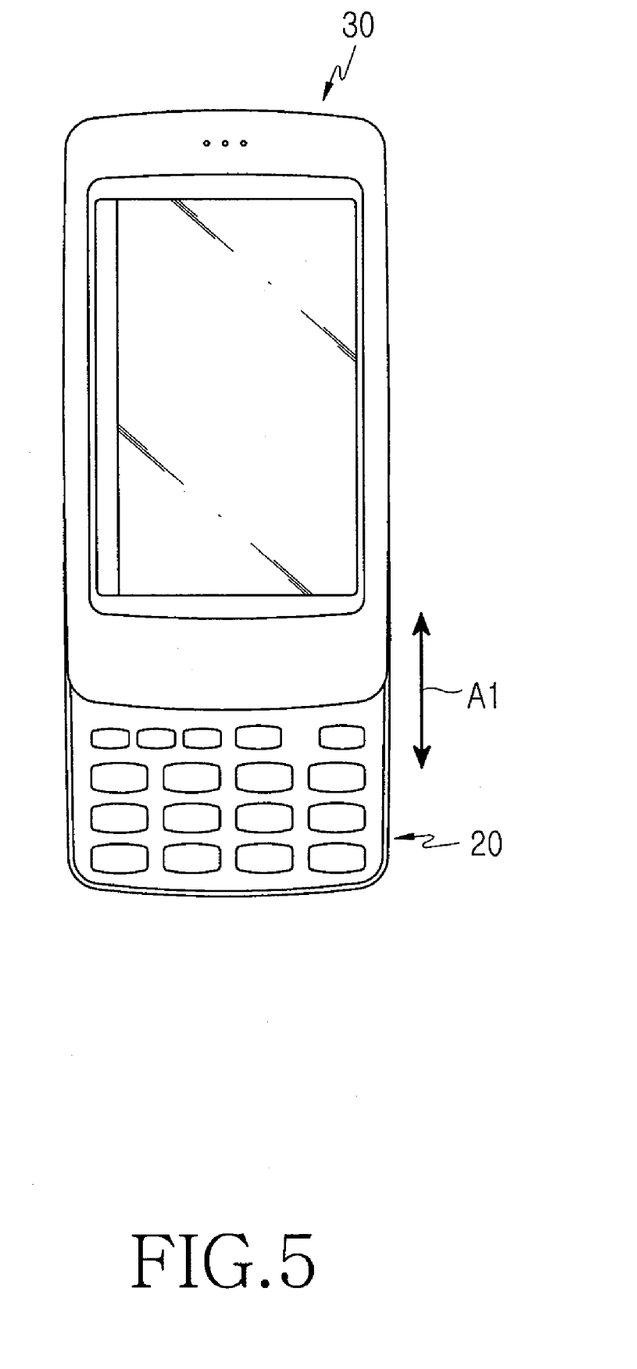
FIG. 5 is a front view of the double sliding-type portable terminal illustrated in FIG. 3, with the sliding housing moved in a first direction by the sliding module.
Figure 6:
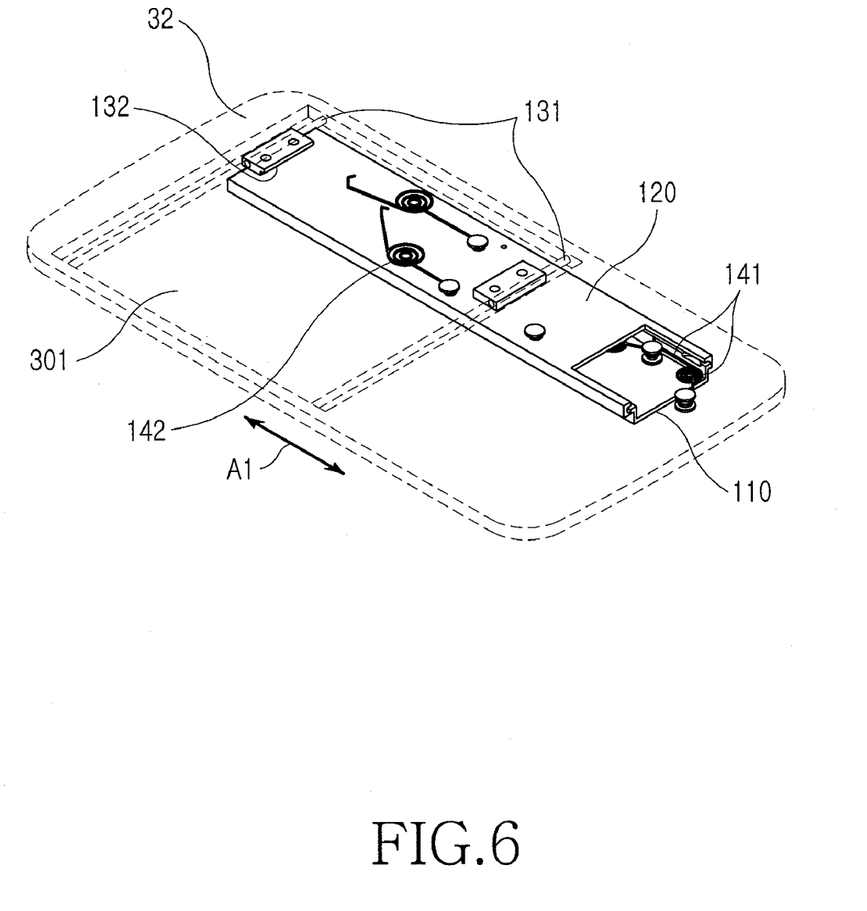
FIG. 6 is a perspective view of the sliding module of the double sliding-type portable terminal illustrated in FIG. 3, with the sliding housing moved in the first direction by the sliding module.

In this state, as shown in FIGS. 5 and 6, when the sliding housing 30 slides in the first direction A1, the first and second sliding members 120 and 130 slide together in the first direction A1.

As shown in FIG. 6, the first elastic member 141 of the elastic means 140 provides the elastic force for the first and second sliding members 120 and 130, so that the first and second sliding members 120 and 130 slide in the first direction A1.

If a user wants to return the sliding housing 30 to the initial position, the sliding housing 30 is slid in the reverse direction.

Figure 7:
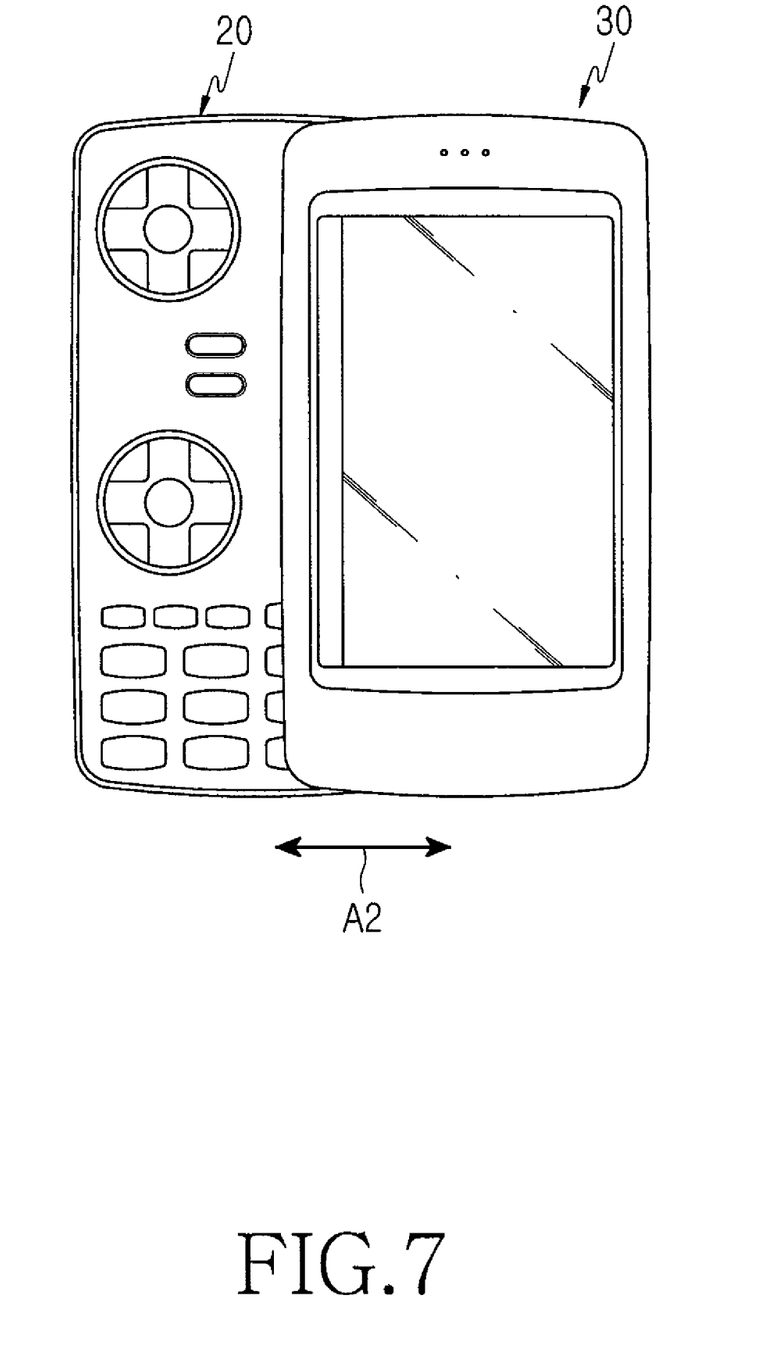
FIG. 7 is a front view of the double sliding-type portable terminal illustrated in FIG. 3, with the sliding housing moved in a second direction by the sliding module.
Figure 8:
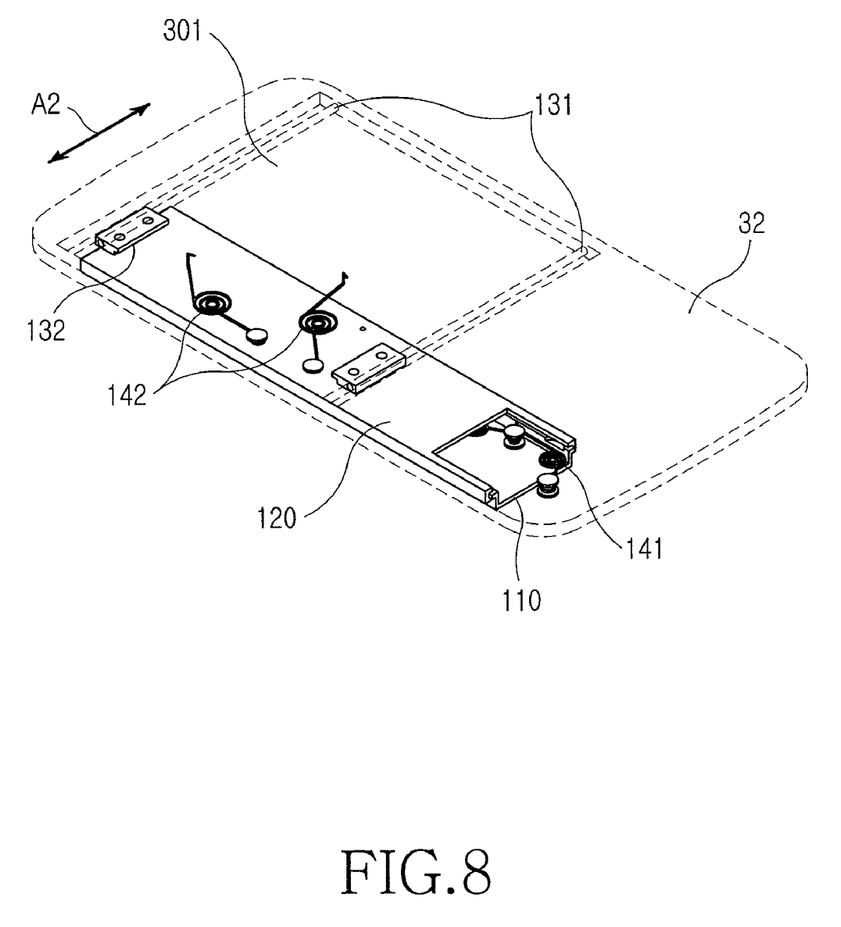
FIG. 8 is a perspective view of the sliding module of the double sliding-type portable terminal illustrated in FIG. 3, with the sliding housing moved in the second direction by the sliding module.

As shown in FIGS. 7 and 8, the sliding housing 30 slides in the second direction A2 and simultaneously the guide rods slide along with the sliding housing 30. The sliding guide units 132 guide the sliding movement of the guide rods 131. At this time, the second elastic member 142 of the elastic means 140 provides an elastic force to the sliding housing 30 so that the sliding housing 30 slides in the second direction A2.

If the user wants to return the sliding housing 30 to the initial position, the sliding housing 30 is slid in the reverse direction.

The guide rods 131 of the second sliding member 130 and the sliding guide units 132 are mounted in the mounting hole 301 formed in the sliding housing 30, resulting in a decrease in the thickness of the sliding module 100 and a decrease in the thickness of the portable terminal.

Figure 9:
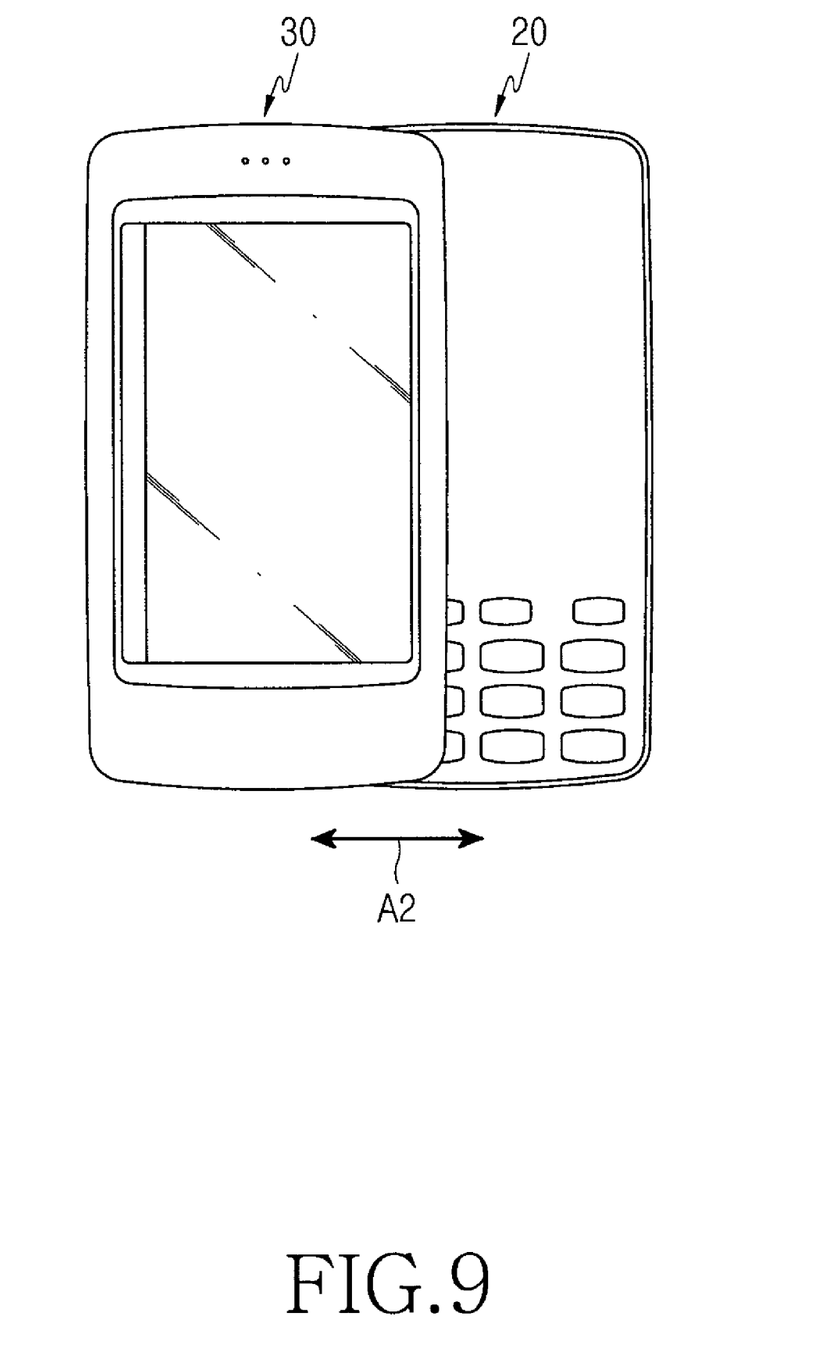
FIG. 9 is a front view of the double sliding-type portable terminal illustrated in FIG. 3, with the sliding housing moved in the second direction by the sliding module.

FIG. 9 shows the sliding movement of the sliding module 100 according to another exemplary embodiment of the present invention. The second sliding member 130 of the sliding module 100 connects the sliding housing 30 to the body housing 20 in such a manner that the sliding housing 30 reciprocally slides on the body housing 20 in the second direction A2.

The operation of a sliding module for a double sliding-type portable communication terminal according to another exemplary embodiment of the prevent invention, which is constructed as mentioned above, will now be described in detail with reference to FIGS. 10 to 14.

Figure 10:
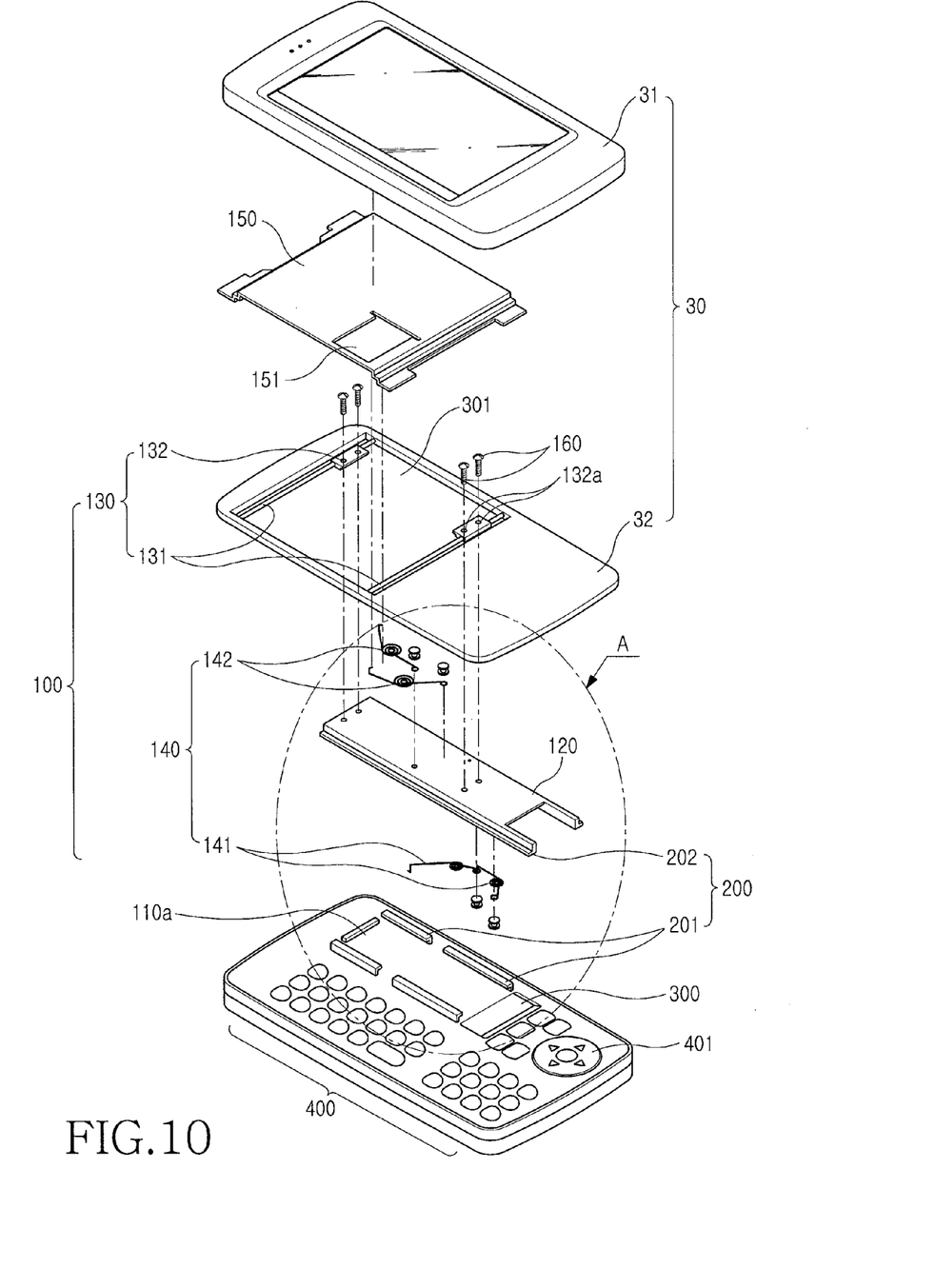
FIG. 10 is an exploded perspective view of a double sliding-type portable terminal with a sliding module according to another exemplary embodiment of the present invention.
Figure 11:
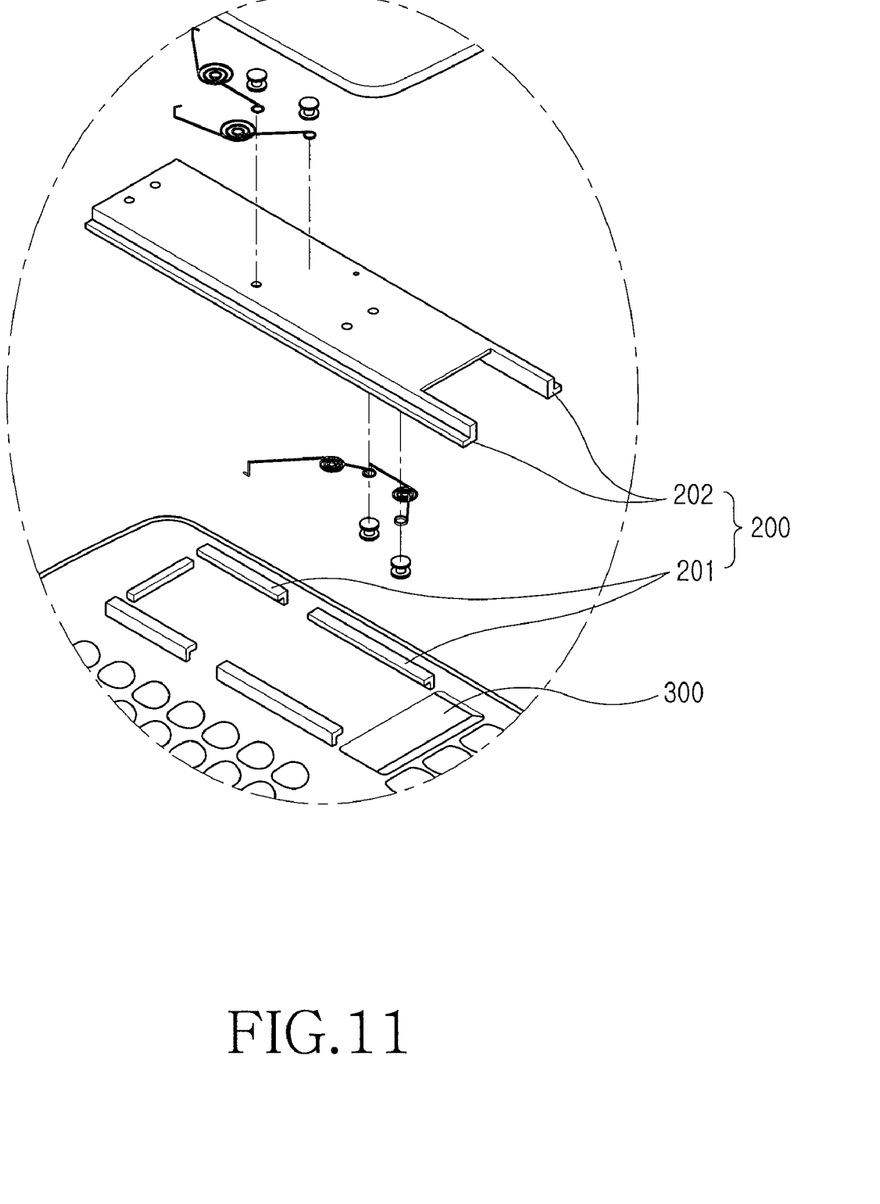
FIG. 11 is an enlarged perspective view of the portion "A" of FIG. 10.

As shown in FIGS. 9, 10 and 11, a sliding module 100 for a double sliding-type portable communication terminal includes a body housing 20, a sliding housing 30, a base member 110a integrally formed on the body housing 20, first and second sliding members 120 and 130, a guide member 150, and a guide unit 200. The first sliding member 120 is stacked on the base member 110 and, in this state, the sliding housing 30 is coupled in such a manner that it can slide in the first direction A1 away from the body housing 20. The second sliding member 130 is integrally mounted in a mounting hole 301 formed in the sliding housing. The second sliding member 130 is stacked on the upper surface of the first sliding member 120, and the sliding housing 30 is coupled in such a manner that it can slide in the second direction A2 away from the body housing 20.

As shown in FIGS. 10 and 11, the guide unit 200 is positioned along the periphery of the base member 110a so as to guide the sliding movement of the first sliding member 120 in the first direction A1.

As shown in FIG. 10, an elastic means 140 is positioned between the first and second sliding members 120 and 130 so as to provide an elastic force for sliding the first and second sliding members 120 and 130. The elastic means 140 includes first and second elastic members 141 and 142.

Figure 12:
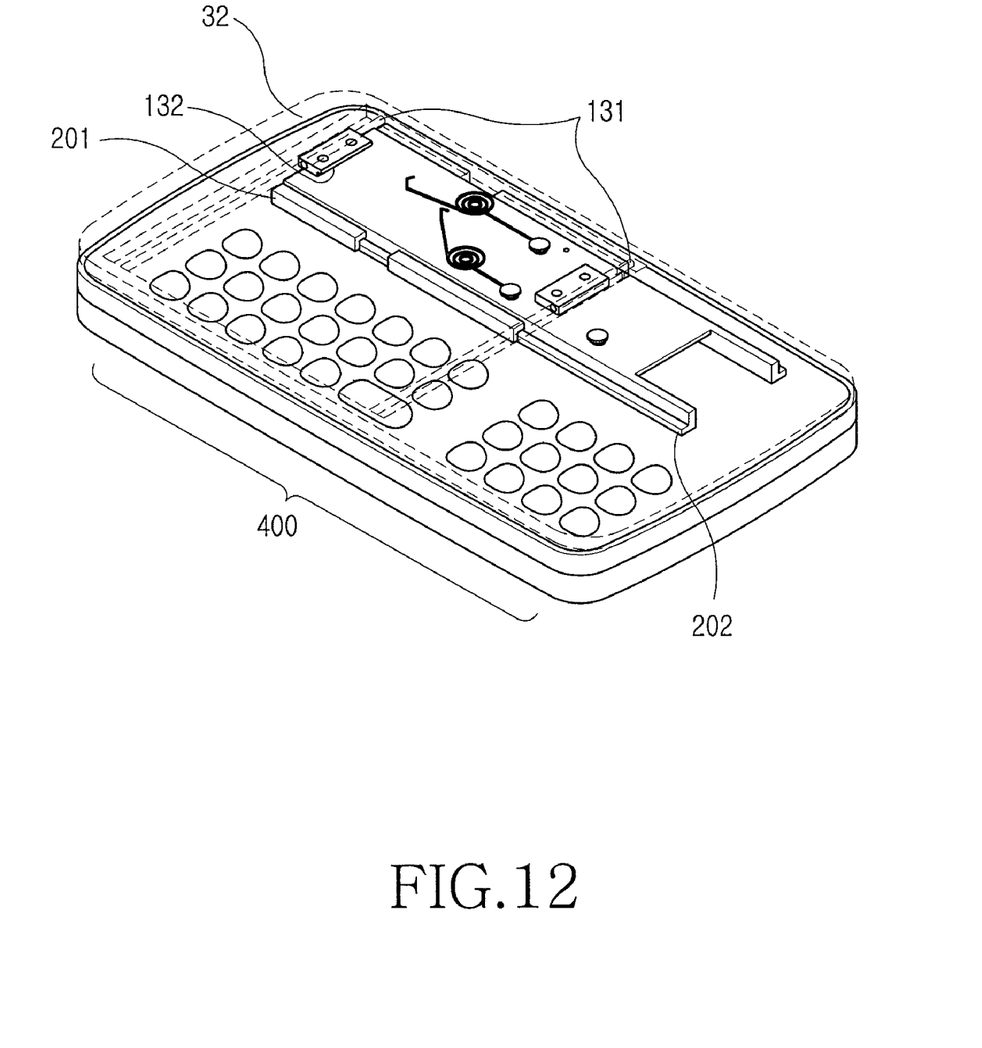
FIG. 12 is a perspective view of the portable terminal of FIG. 10 showing the sliding module in an assembled state.
Figure 13:
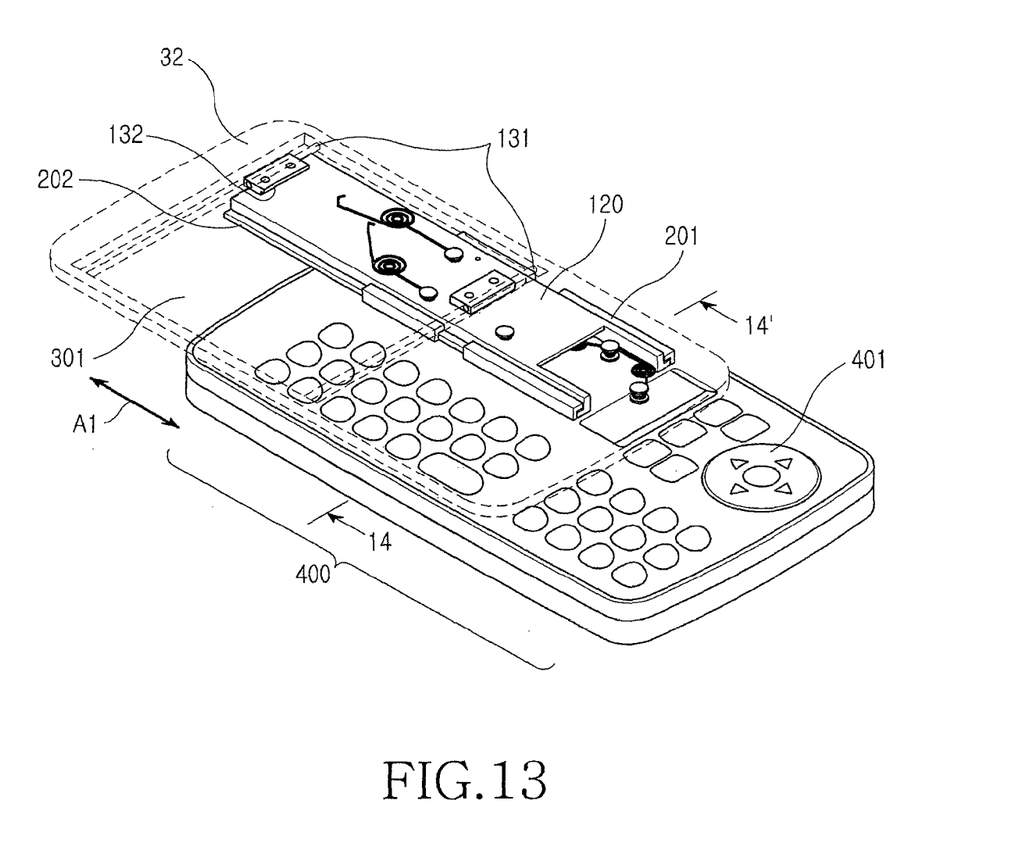
FIG. 13 is a perspective view of the portable terminal of FIG. 10 showing the sliding module of FIG. 10 after the sliding housing is moved in the first direction.
Figure 14:
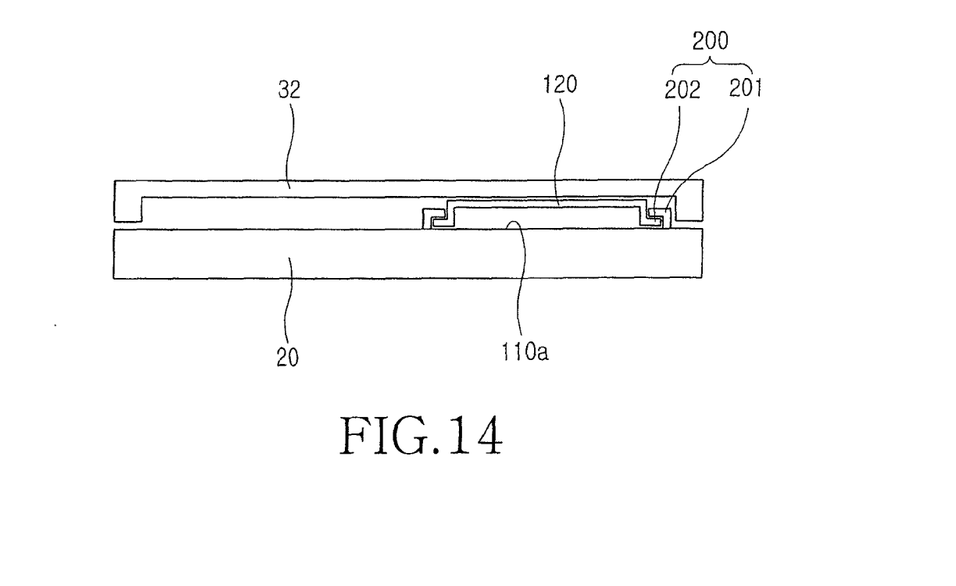
FIG. 14 is a sectional view taken along line 14-14' of FIG. 13.

In this state, if the sliding housing 30 is slid in the first direction A1 as shown in FIGS. 12 and 13, the first and second sliding members 120 and 130 slide together in the first direction A1.

As shown in FIG. 13, the first elastic member 141 of the elastic means 140 provides an elastic force so that the first and second sliding members 120 and 130 can slide in the first direction A1.

To return the sliding housing 30 to the original position, it is slid in a reverse direction.

As shown in FIG. 13, the first sliding member 120 has guide ribs 202 formed on opposite ends thereof. The guide ribs 202 are adapted to engage the guide rails 201 of the guide unit 200 while being able to slide. If the first and second sliding members 120 and 130 slide in the first direction A1, the guide ribs 202 of the first sliding member 120 are guided along the guide rails 201 and slide accordingly.

As shown in FIG. 10, the base member 110a is integrally formed on the body housing 20, and the guide rails 201 of the guide unit 200 are also integrated with the body housing 20. The guide ribs 202 may also be integrally formed on opposite ends of the first sliding member 120. This reduces the thickness of the sliding module 100 and produces a slim terminal.

The base member 110a may be made of a metallic material for enhanced rigidity.

As shown in FIG. 10, a flexible circuit hole 300 is formed adjacent to the base member 110a so that a flexible circuit (not shown), which is electrically connected to the sliding housing 30, may extend therethrough.

If the sliding housing 30 is slid in the second direction A2 as shown in FIGS. 10, 12, and 13, alphanumeric keys 400 on the body housing 20 are exposed. If the sliding housing 30 is slid to the original position, the alphanumeric keys 400 are covered. The alphanumeric keys 400 may be arranged in a "QWERTY" pattern.

If the sliding housing 30 is slid in the first direction A1, navigation keys 401 on the body housing 20 are exposed. If the sliding housing 30 is slid to the original position, the navigation keys 401 are covered.

The present invention may be applicable to all kinds of the portable terminals.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sliding module for a double sliding-type portable communication terminal which comprises a body housing and a sliding housing movably coupled to the body housing so as to slide on the body housing in a first direction and a second direction substantially perpendicular to the first direction, the sliding module comprising:
   a base member;
   a first sliding member laminated on the base member to enable the sliding housing to slide on the body housing in the first direction;
   a second sliding member integrally mounted on the sliding housing and laminated on the first sliding member to allow the sliding housing to slide on the body housing in the second direction; and
   a guide member provided for the sliding housing to guide the sliding movement of the second sliding member,
   wherein the second sliding member comprises at least one guide rod mounted on the sliding housing and at least one sliding guide unit mounted on the at least one guide rod while being fixed to the upper surface of the first sliding member, the at least one sliding guide unit guiding the sliding movement of the sliding housing in the second direction.

2. The sliding module as claimed in claim 1, wherein the sliding housing further comprises a mounting hole in the sliding housing to accommodate the second sliding member and the guide member.

3. The sliding module as claimed in claim 1, wherein the at least one sliding guide unit further comprises at least one screw-hole for receiving a fastener to mount the first sliding member.

4. The sliding module as claimed in claim 1, wherein the guide member is a plate with a recessed center portion.

5. The sliding module as claimed in claim 4, wherein the plate further comprises a flexible circuit hole in the plate to allow a flexible circuit to extend therethrough.

6. A sliding module for a double sliding-type portable communication terminal which comprises a body housing and a sliding housing movably coupled to the body housing so as to slide on the body housing in a first direction and a second direction substantially perpendicular to the first direction, the sliding module comprising:
   a base member;
   a first sliding member laminated on the base member to enable the sliding housing to slide on the body housing in the first direction;
   a second sliding member integrally mounted on the sliding housing and laminated on the first sliding member to allow the sliding housing to slide on the body housing in the second direction; and
   a guide member provided for the sliding housing to guide the sliding movement of the second sliding member,
   wherein the second sliding member comprises at least on guide rod mounted on the sliding housing and at least one sliding guide unit mounted on the at least one guide rod while being fixed to the upper surface of the first sliding member, the at least one sliding guide unit guiding the sliding movement of the sliding housing in the second direction.

7. A sliding module for a double sliding-type portable communication terminal comprising a body housing, a sliding housing coupled to the body housing so as to slide on the body housing in a first direction and in a second direction substantially perpendicular to the first direction, and a sliding module for enabling sliding movement in the first and second directions, the sliding module comprising:
   a base member integrally formed on the body housing;
   a first sliding member stacked on the base member so as to enable the sliding housing to slide in the first direction away from the body housing;
   a second sliding member integrally mounted on the sliding housing and stacked on the first sliding member so as to enable the sliding housing to slide in the second direction away from the body housing;
   a guide member positioned on the sliding housing so as to guide sliding movement of the second sliding member; and
   a guide unit positioned along a periphery of the base member so as to guide sliding movement of the first sliding member,
   wherein the second sliding member comprises at least on guide rod mounted on the sliding housing and at least one sliding guide unit mounted on the at least one guide rod while being fixed to the upper surface of the first sliding member, the at least one sliding guide unit guiding the sliding movement of the sliding housing in the second direction.

8. The sliding module as claimed in claim 7, further comprising a flexible circuit hole adjacent to the base member to allow a flexible circuit connected to the sliding housing to extend therethrough.

9. The sliding module as claimed in claim 7, wherein the guide unit comprises at least one guide rail slidably coupled to at least one guide rib of the first sliding member.

10. The sliding module as claimed in claim 9, wherein the guide rail comprises an L-shaped configuration.

11. The sliding module as claimed in claim 7, wherein the base member comprises made of a metallic material.

12. The sliding module as claimed in claim 7, wherein the body housing comprises alphanumeric keys and navigation keys that are exposed and covered based on the sliding movement of the sliding housing in the first and second directions.

13. A portable terminal comprising:
   a body housing;
   a sliding housing coupled to the body housing so as to slide on the body housing in a first direction and in a second direction;
   a base member disposed on the body housing;
   a first sliding member disposed on the base member to enable the sliding housing to slide on the body housing in the first direction;
   a second sliding member disposed on the sliding housing and engaging the first sliding member to allow the sliding housing to slide on the body housing in the second direction; and
   a guide member on the sliding housing to guide the sliding movement of the second sliding member,
   wherein the second sliding member comprises at least on guide rod mounted on the sliding housing and at least one sliding guide unit mounted on the at least one guide rod while being fixed to the upper surface of the first sliding member, the at least one sliding guide unit guiding the sliding movement of the sliding housing in the second direction.

14. The portable terminal as claimed in claim 13, wherein the base member is integrally formed on the body housing.

15. The portable terminal as claimed in claim 14, further comprising a guide unit on the base member to guide sliding movement of the first sliding member.

16. The portable terminal as claimed in claim 15, wherein the guide unit comprises at least one guide rail slidably coupled to at least one guide rib on the first sliding member.

17. The portable terminal as claimed in claim 13, wherein the body housing comprises alphanumeric keys and navigation keys that are exposed and covered based on the sliding movement of the sliding housing in the first and second directions.

18. The portable terminal as claimed in claim 13, wherein the second direction is substantially perpendicular to the first direction.

19. The portable terminal as claimed in claim 13, wherein the second sliding member comprises at least one guide rod mounted on the sliding housing and at least one sliding guide unit mounted on the at least one guide rod while being fixed to the upper surface of the first sliding member, the at least one sliding guide unit guiding the sliding movement of the sliding housing in the second direction.

* * * * *